(No Model.)

R. P. CARPENTER.
SEED CASE.

No. 323,396. Patented Aug. 4, 1885.

Attest  
James Barber  
Howard N. Hart

Inventor  
Robert P. Carpenter  
By his atty.

UNITED STATES PATENT OFFICE.

ROBERT P. CARPENTER, OF PHILADELPHIA, PENNSYLVANIA.

SEED-CASE.

SPECIFICATION forming part of Letters Patent No. 323,396, dated August 4, 1885.

Application filed December 10, 1884. (No model.)

*To all whom it may concern:*

Be it known that I, ROBERT P. CARPENTER, of the city and county of Philadelphia, and State of Pennsylvania, have invented a new and useful Improvement in Seed-Cases, of which the following is a specification.

My invention has reference to seed-cases; and it consists in certain improvements by which the seeds, after being packed in boxes and bags or packages, may be displayed in stores, preferably upon the counter, whereby the names of the seeds may be readily seen and the desired package extracted without displacement of those remaining, the details of construction thereof being fully set forth in the following specification, and shown in the accompanying drawings, which form part thereof.

In my patent dated April 4, 1882, and numbered 255,771, I described a seed-case specially adapted for stores and farms, which, while very useful and requiring but little space, was nevertheless defective in that the various seeds or the packages containing them were not so displayed that the names or engravings representing the products of said seeds were exhibited so that the position of the desired seed could be ascertained at a glance and extracted quickly and without displacement to those remaining. This invention is, therefore, to overcome the said defects and provide a case which shall so expose the packages containing the seeds that their names or engravings representing the products, or both, are exposed and so supported that they are extracted vertically instead of horizontally, whereby one package may be extracted without in anywise displacing those remaining. By this arrangement the packages themselves act as labels indicating the location of the various seeds, which is an advantage, inasmuch that if the line of seeds were varied in the old form of case the labels would also have to be changed.

Figure 1:
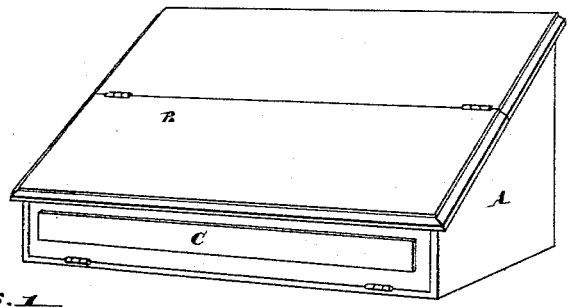
Figure 2:
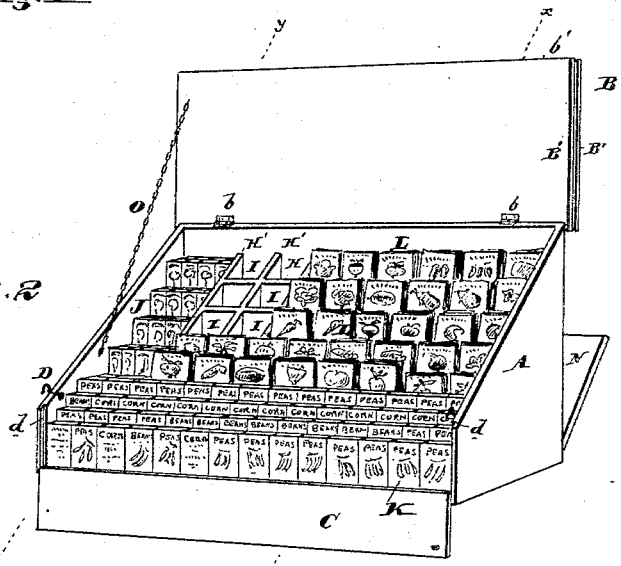
Figures 3, 4:
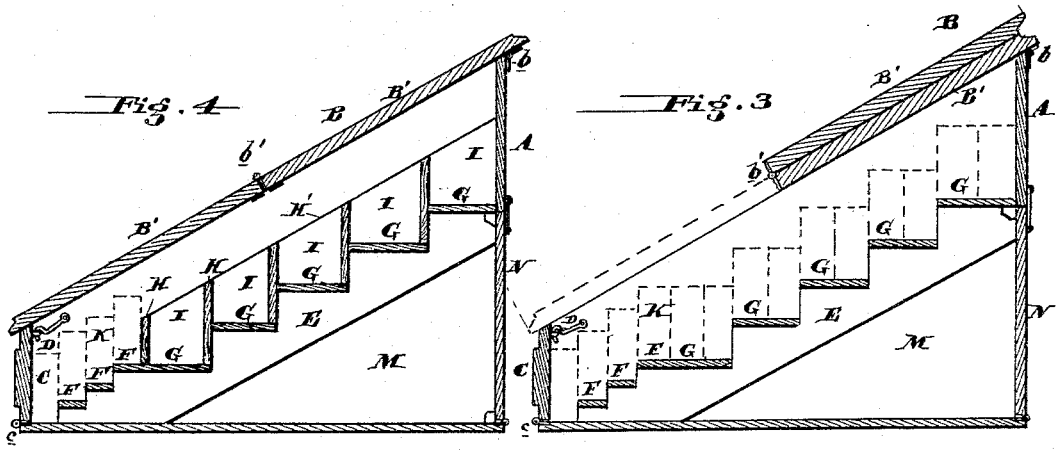

In the drawings, Figure 1 is a perspective view of my improved seed-case closed. Fig. 2 is a similar view of same, showing the seed-case open and filled with packages of seeds. Fig. 3 is a sectional elevation of same on line Y Y. Fig. 4 is a similar view on line X X.

A is the main frame of the case, and is formed triangular in cross-section. It is provided on the top with a lid, B, hinged at $b$ to the rear part of case A, and preferably consists of the two parts B B', hinged together at $b'$, whereby they may be first folded together, as indicated in Fig. 3, and then raised, as indicated in Fig. 2, being retained in a vertical position by chain O or the rear extension of the lid, whereby the salesman back of the counter may readily look over the top, and that the view of the case in the rear of the counter shall not be obstructed unnecessarily. The front of the case C is hinged at $c$ to the bottom, so that it may fall down, as indicated in Fig. 2, entirely exposing the lowermost packages of seeds. When closed it fits in the recess, and may be secured by hooks or locks D.

Each end of the case A is provided with a step-rail, E, arranged obliquely to the floor, which support the steps F and G, the former of which are arranged nearest the front and bottom of the case, and the latter of which are arranged in the rear thereof and on gradually higher levels in the form of steps. All or part of these steps G may be divided by vertical divisions H and H', whereby they form all the bottoms of the compartments I, into which the seed boxes or packages L are deposited, each compartment representing a distinct seed. Upon a similar and lower step, F, the box or case of seeds K is placed. It fitting snugly therein and being stiff requires no vertical walls. In large seed-cases it is customary to leave part J of the steps G unprovided with vertical walls, whereby the case or box of seeds K may also be placed upon these steps, as indicated in Figs. 2 and 3.

The rear part of the case A is provided with a door, N, which may be hinged or sliding, and is adapted to form a passage-way to the compartment M, located under the steps G and within the case A, wherein seeds may be packed or stored to replenish the upper part of the case as the packages therein become exhausted.

I do not limit myself to any particular number of steps or the size thereof, and, therefore, while I prefer the construction shown, it may be modified in various ways without departing from my invention.

Having now described my invention, what I claim as new, and desire to secure by Letters Patent, is—

1. A case for containing and exhibiting seeds, which consists of a box, A, made substantially triangular in cross section, open on the top, and provided with the steps F and receptacles I, in combination with a suitable lid or cover formed of the two parts B' B', hinged together and at the upper part of the case, substantially as and for the purpose specified.

2. A seed-case having a series of steps, G, arranged one above the other, part of which have receptacles I and part are left without, steps F, arranged in front and below the steps G, and a door, C, adapted to open down and expose the steps F or their contents, substantially as and for the purpose specified.

3. The box A, made substantially triangular in cross-section, and provided with steps F and receptacles I, arranged substantially as shown, lid B, and door C, substantially as and for the purpose specified.

4. The box A, made substantially triangular in cross-section, and provided with steps F and receptacles I, arranged substantially as shown, lid B, and doors C and N, substantially as and for the purpose specified.

In testimony of which invention I hereunto set my hand.

ROBERT P. CARPENTER.

Witnesses:
R. M. HUNTER,
WILLIAM C. MAYNE.